(12) United States Patent
Doyle

(10) Patent No.: US 12,691,557 B2
(45) Date of Patent: Jul. 28, 2026

(54) TORQUE STICK AND WRENCH

(71) Applicant: Milwaukee Electric Tool Corporation, Brookfield, WI (US)

(72) Inventor: Brian J. Doyle, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 820 days.

(21) Appl. No.: 17/103,138

(22) Filed: Nov. 24, 2020

(65) Prior Publication Data

US 2021/0146515 A1 May 20, 2021

Related U.S. Application Data

(63) Continuation of application No. PCT/US2020/060175, filed on Nov. 12, 2020.

(60) Provisional application No. 62/936,021, filed on Nov. 15, 2019.

(51) Int. Cl.
B25B 23/147 (2006.01)
B60B 29/00 (2006.01)

(52) U.S. Cl.
CPC ........ B25B 23/1475 (2013.01); B60B 29/006 (2013.01)

(58) Field of Classification Search
CPC ............ B25B 23/0021; B25B 23/1475; B25B 13/005; F16C 2326/02; F16C 2229/00
USPC .................... 73/862.23; 29/407.05; 81/177.5
See application file for complete search history.

(56) References Cited

U.S. PATENT DOCUMENTS

| | | | |
|---|---|---|---|
| 1,578,065 A | 3/1926 | Bemus et al. | |
| 1,628,467 A | 5/1927 | Mandl | |
| 1,807,134 A | 5/1931 | Pfauser | |
| 1,873,472 A | 8/1932 | Pfauser | |
| 2,290,197 A | 7/1942 | Merriman et al. | |
| 2,667,800 A | 2/1954 | Garwood | |
| 3,638,519 A | 2/1972 | Rebold | |
| 3,847,038 A | 11/1974 | Green | |
| 3,911,736 A * | 10/1975 | Miller ................. | B25B 23/1427 |
| | | | 73/862.321 |

(Continued)

FOREIGN PATENT DOCUMENTS

| | | |
|---|---|---|
| CN | 2253271 Y | 4/1997 |
| CN | 102039568 | 5/2011 |

(Continued)

OTHER PUBLICATIONS

Translation of DE3622366A1 (Year: 1987).*

(Continued)

*Primary Examiner* — Tom Rodgers
(74) *Attorney, Agent, or Firm* — Reinhart Boemer Van Deuren s.c.

(57) ABSTRACT

A torque stick and torque wrench combination is provided that allows attachment of the torque stick to an impact tool to quickly fasten a nut or lug to an approximate desired torque. The operator can attach a torque wrench to an aperture of the torque stick to complete the fastening operation and achieve higher accuracy on the applied torque than a torque stick alone. In this way, the combination torque stick and torque wrench enable a greater degree of accuracy on the fastener's torque. The operator can also complete the fastening process without disassembling the connection of the torque stick from the lug.

10 Claims, 3 Drawing Sheets

(56) References Cited

U.S. PATENT DOCUMENTS

| | | | |
|---|---|---|---|
| 4,290,329 A | | 9/1981 | Green |
| 4,408,504 A | | 10/1983 | Dobosh |
| 4,603,606 A | | 8/1986 | Headen |
| 4,665,390 A | | 5/1987 | Kern et al. |
| 4,709,598 A | | 12/1987 | Headen |
| 4,709,602 A | | 12/1987 | Grabovac et al. |
| 4,759,242 A | * | 7/1988 | Andersson .......... B25B 23/1427 |
| | | | 81/475 |
| 4,939,961 A | | 7/1990 | Lee |
| 5,007,311 A | | 4/1991 | Lee |
| 5,123,313 A | * | 6/1992 | Andersson .............. B25B 13/06 |
| | | | 81/477 |
| 5,199,329 A | | 4/1993 | Hsu |
| 5,619,890 A | | 4/1997 | Hattori et al. |
| 5,653,151 A | | 8/1997 | Blacklock |
| 5,709,137 A | | 1/1998 | Blacklock |
| 5,996,453 A | | 12/1999 | Blacklock |
| 7,267,033 B1 | | 9/2007 | Lai |
| 7,367,250 B2 | | 5/2008 | Rainone et al. |
| 9,457,457 B2 | | 10/2016 | Chiang |
| 9,597,782 B2 | | 3/2017 | Abel |
| 2004/0083858 A1 | | 5/2004 | Carnesi |
| 2006/0102442 A1 | | 5/2006 | Dein |
| 2007/0095155 A1 | | 5/2007 | Rainone et al. |
| 2007/0256525 A1 | | 11/2007 | Lee |
| 2008/0229888 A1 | | 9/2008 | Ishmael |
| 2008/0276762 A1 | | 11/2008 | Dein |
| 2009/0260491 A1 | | 10/2009 | Rainone et al. |
| 2012/0174379 A1* | | 7/2012 | Teper ................. B25B 23/1427 |
| | | | 29/434 |
| 2015/0314426 A1 | | 11/2015 | Chiang |
| 2016/0271761 A1 | | 9/2016 | Chang |
| 2017/0144280 A1* | | 5/2017 | Shyu ..................... B25G 1/005 |

FOREIGN PATENT DOCUMENTS

| | | | | | |
|---|---|---|---|---|---|
| CN | 102216035 | | 10/2011 | | |
| CN | 102729193 A | | 10/2012 | | |
| CN | 203818054 | | 9/2014 | | |
| DE | 3622366 A | * | 12/1987 | .......... | B25B 13/005 |
| DE | 202006019413 | | 3/2007 | | |
| DE | 102013208289 | | 11/2014 | | |
| DE | 202016002404 | | 6/2016 | | |
| EP | 2110206 | | 10/2009 | | |
| FR | 1307374 | | 10/1962 | | |
| FR | 1431041 | | 3/1966 | | |
| GB | 2433222 A | * | 6/2007 | ......... | B25B 23/0035 |
| JP | 06-027069 | | 4/1994 | | |
| JP | 2004-001189 | | 1/2004 | | |
| JP | 2004001189 A | * | 1/2004 | ......... | B25B 23/1427 |
| TW | 175051 | | 12/1991 | | |
| TW | M256804 | | 2/2005 | | |
| TW | M377293 | | 4/2010 | | |
| TW | 201026447 | | 7/2010 | | |
| TW | M429559 | | 5/2012 | | |
| WO | WO8604008 | | 7/1986 | | |
| WO | WO9904178 | | 1/1999 | | |
| WO | WO9936229 | | 7/1999 | | |
| WO | WO2010076331 | | 7/2010 | | |

OTHER PUBLICATIONS

International Search Report and Written Opinion for International Application No. PCT/US2020/060175, dated Feb. 24, 2021, 10 pages.

* cited by examiner

TORQUE STICK AND WRENCH

CROSS-REFERENCE TO RELATED PATENT APPLICATION

The present application is a continuation of International Application No. PCT/US2020/060175, filed Nov. 12, 2020, which claims the benefit of and priority to U.S. Provisional Patent Application No. 62/936,021 filed on Nov. 15, 2019, which are incorporated herein by reference in their entireties.

BACKGROUND OF THE INVENTION

The present invention relates to torque sticks and torque wrenches. Torque sticks and wrenches are used to tighten fasteners up to a predetermined torque or torque specification. For example, torque sticks and wrenches limit the torque applied to a fastener of a joint. Torque sticks stop applying torque once the torque limit/specification is reached. Torque wrenches are then used to tighten the fastener accurately. When the torque specification value is reached, the torque wrench signals (e.g., tactually, visually, and/or audibly) that the fastener resistance has reached the set torque, which indicates to the operator to stop torquing or tightening the fastener. In other embodiments, torque wrenches include a gauge indicating the amount of torque currently being applied by the user. The user then stops torquing the fastener when they reach the desired torque setting displayed on the gauge.

SUMMARY OF THE INVENTION

One embodiment of the invention relates to a torque limiting extension bar or torque stick with a wrench aperture. The torque stick includes an elongated shaft with a socket at one end and an impact tool attachment at a second end opposite the first end. The socket is configured to couple to a rotary tool, e.g., a drill chuck of an impact drill. The impact tool attachment is configured to couple to a lug to a fastener (e.g., a nut on a work-piece coupled to the impact tool through the torque stick). The torque stick limits the torque that the impact tool applies on the lug based on the torque stick's thickness and elastic modulus. The torque stick includes a torque aperture that receives a torque wrench within the torque stick and applies a calibrated torque to the impact tool, such that the fastener is tightened to the torque specification.

Another embodiment of the invention relates to a torque wrench inserted in the torque aperture. The torque wrench includes an attachment end with a torque scale on a sleeve of the torque wrench. The torque wrench sleeve is coupled to a handle via a shaft.

Another embodiment of the invention relates to a torque stick. The torque stick has an elongated shaft that extends along a longitudinal axis from a first end to a second end opposite the first end. A socket is located at the first end of the elongated shaft that couples to a rotary tool. An impact tool attachment is located at the second end of the elongated shaft that couples to a fastener. The torque stick includes a torquing aperture along the elongated shaft between the first and second ends. The torquing aperture receives a wrench within the torquing aperture of the torque stick.

Another embodiment of the invention relates to a torque wrench. The torque wrench has an attachment end configured to be inserted into an aperture of a torque stick and statically load the torque stick. A handle of the torque stick is located opposite the attachment end. A sleeve is coupled to the handle and extends to the attachment end. The sleeve includes a torque scale along the sleeve. The torque scale indicates a static torque load limit of the sleeve when inserted into the torque stick's aperture. A taper on the sleeve makes the outer diameter greater nearer the handle than the sleeve's outer diameter nearer the attachment end.

Another embodiment of the invention relates to a torque limiting tool with a torque stick and a torque wrench. The torque stick has an elongated shaft with a thickness and elastic modulus. The elongated shaft extends along a longitudinal axis from a first end to a second end opposite the first end. A socket for dynamic loading is located at the first end of the elongated shaft and couples to a rotary tool. An impact tool attachment is located at the second end of the elongated shaft and couples to a fastener. The elongated shaft includes a torque aperture that can be statically loaded along the elongated shaft. The torque wrench has an attachment end inserted into the torque stick's socket to load the torque stick statically. A handle is located opposite the attachment end. A sleeve is coupled to the handle and extends to the attachment end, and the attachment end of the torque wrench is inserted within the socket of the torque stick to continuously load the elongated shaft.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
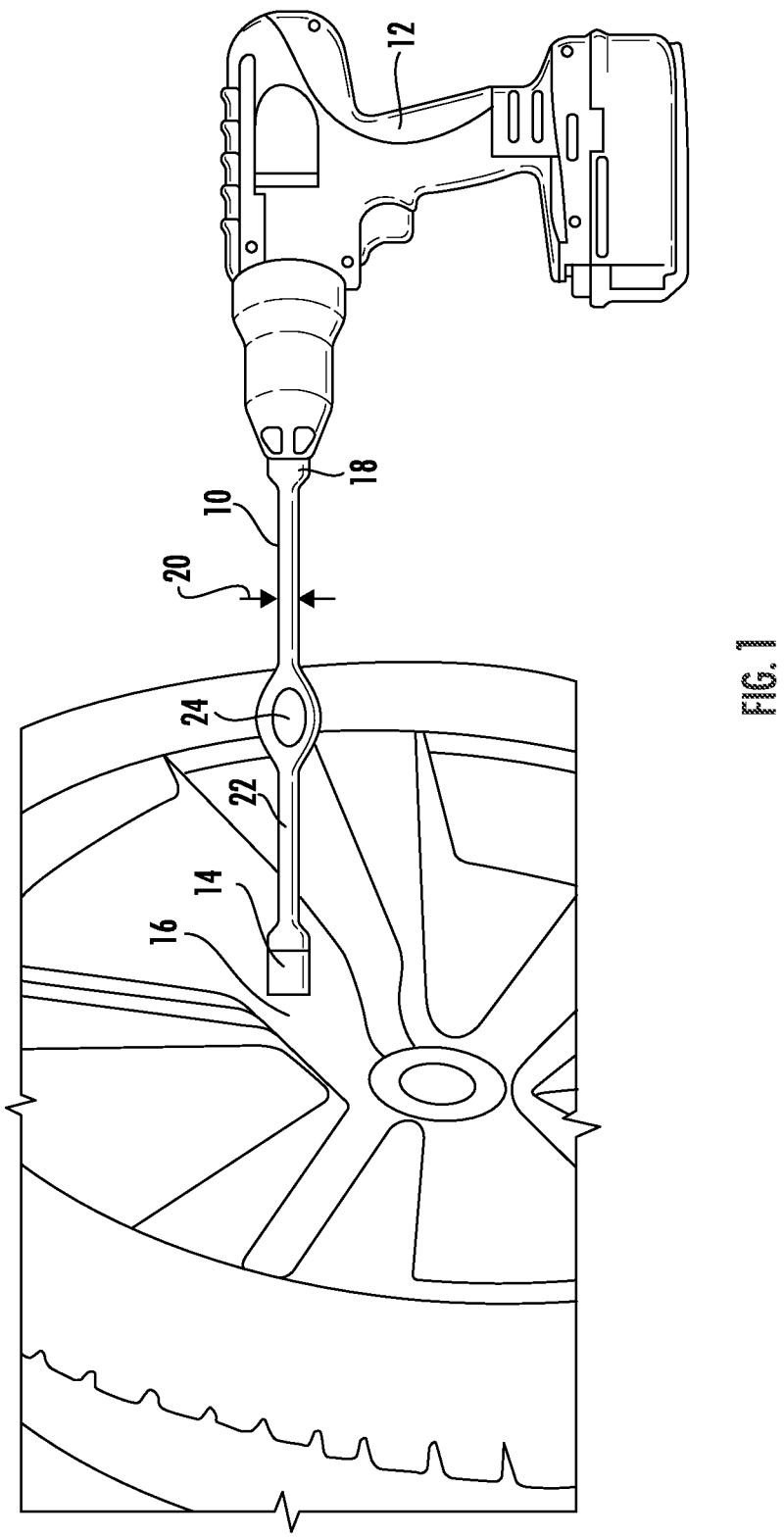
FIG. 1 is a perspective view of a torque stick, according to an exemplary embodiment.

Referring generally to the figures, various embodiments of a torque stick and wrench are shown. Torque sticks provide a limit to the torque an impact tool applies to a lug. The torque stick's elastic modulus and thickness prevent the impact tool from applying a torque that is greater than the designed torque (e.g., the torque specification). For example, fasteners create a clamping force on a joint that stretches the fastener. The fastener clamping force is generally measured indirectly as the torque (e.g., foot-pounds) is required to turn the fastener's threads. When the fastener is not adequately tightened (e.g., too little torque is applied), the joint may become loose, causing a fastened wheel to become too loose. Conversely, when the fastener is over-tightened and too much torque is applied, the fastener may stretch the bolt's stud or flank past the yield level. Stretching past the yield level of the fastener permanently deforms and weakens the bolt. Therefore, the proper installation uses a torque specification, and torque sticks and/or torque wrenches are commonly used to ensure an adequate, but not excessive, torque is applied to the lug to fasten a bolt. In this way, the lug creates the correct clamping force based on the recommended torque specifications for the joint.

Torque sticks are commonly used with impact tools, such as air or electric (e.g., cordless) impact wrenches or drills, etc. When the torque limit is reached, the torque stick flexes, like a torsion bar, at the torque limit to prevent the impact of the wrench from turning the lug. If a static or continuous load is applied to the torque stick, it will continue to turn the lug. As used in this application, a dynamic or impact load or force includes an acceleration of mass, whereas a static or continuous load or force has small, negligible, or zero acceleration.

The dynamic impact load applied from an impact tool is effectively absorbed by the torque stick and not transmitted to the lug. This enables an operator to rapidly apply a limited torque to the lug with an impact tool. However, because the torque stick deflects under a dynamic load to limit the applied torque, using a torque stick approaches the limited torque but is not a substitute for the accuracy achieved with a torque wrench. The torque wrench provides a more accurate torque application on the lug because the load is static or applied continuously on the lug. To properly secure a torque limited joint at the torque specification, the operator first connects the lug to the bolt by hand and begins the threading process. The operator then couples a torque stick to a dynamic impact tool, roughly approaching the torque limit but is less than the torque specification. The operator then removes the torque stick from the fastener to couple a torque wrench to the lug, and the operator applies the design specification torque via the torque wrench.

Applicant has found that placing an aperture within an elongated shaft of the torque stick simplifies fastening a torque limited nut to the torque specification. Specifically, the operator dynamically loads the torque stick with an impact tool and then uses a torque wrench that couples to the aperture of the torque stick to load the nut statically and reach the desired torque. The torque stick is quickly dynamically loaded to a threshold torque and then continuously statically loaded to the torque specification. This process also eliminates the step of detaching the torque stick and attaching a separate torque wrench that facilitates the torque specification's accurate application to the lug and joint.

FIG. 1 shows a torque stick 10 coupled to an impact tool 12 and a lug 14 (e.g., to fasten a nut on a wheel). One common application where the torque applied to a fastener is limited/controlled is the application of lug 14 on a car, truck, or another automobile. If the torque is too high and the bolt exceeds the yield stress, joint 16 is permanently deformed and weakened. Similarly, under-tightening lug 14 or nut may result in a loose connection that may become loose under a cyclical load.

As illustrated in FIG. 1, torque stick 10 includes a socket 18 to couple torque stick 10 to impact tool 12 (e.g., an air or electric wrench or drill). Impact tool 12 delivers a dynamic impact rotational load or force on torque stick 10 that is transmitted to a fastener, shown as lug 14, if the torque applied by impact tool 12 is less than the torque stick 10 design torque limit. Socket 18 receives and is configured for dynamic loading from impact tool 12.

Torque stick 10 is constructed from a material with an elastic modulus that flexes as the impact load is applied to joint 16. For example, a series of torque sticks 10, made from the same material (e.g., with the same elastic modulus), are designed to deflect at different torques by controlling a thickness 20 of an elongated body 22 of torque stick 10.

In this way, a set of torque sticks 10 limits the torque applied (e.g., torque specifications) to a variety of different joints 16. In some embodiments, a thickness and/or elastic modulus that support a dynamic load of less than or equal to 100 ft-lb torque. For example, torque stick 10 limits the torque to less than or equal to 7.5 ft-lb, 10 ft-lb, 15 ft-lb, 20 ft-lb, 25 ft-lb, 30 ft-lb, 40 ft-lb, 50 ft-lb, 75 ft-lb, or 100 ft-lb. In some embodiments, a variety of materials are used to construct a set of torque sticks 10. The set of torque sticks 10 uses different materials to limit the applied torque to the values listed above. For example, a set of torque sticks 10 has different materials with different elastic moduli and/or various thicknesses 20 along an axial or longitudinal direction of elongated body 22.

In some embodiments, torque stick 10 includes a continuously torquing aperture 24 or static torque aperture 24 ("aperture 24"). Aperture 24 is a slot, bore, or hole in the elongated body 22 of torque stick 10. Aperture 24 is configured to receive an attachment end 26 of a torque wrench 28 (FIG. 3) to statically/continuously load lug 14. For example, after the impact tool 12 has exceeded the design torque limit of torque stick 10. This combination utilizes the speed and convenience of torque stick 10 and the accuracy of the static load applied by torque wrench 28, without disconnecting torque stick 10 from lug 14 or joint 16.

Aperture 24 can be located at different positions along elongated body 22. In various embodiments, aperture 24 is centrally located between socket 18 at one end and impact tool attachment 30 at the opposite end. For example, centrally located is at or near a midpoint along longitudinal axis 45. Specifically, in a centrally located aperture 24, the midpoint between socket 18 and tool attachment 30 is located within aperture 24. Similarly, aperture 24 is located along longitudinal axis 45 closer to socket 18 at one end than the impact tool attachment 30 at the opposite end. Alternatively, aperture 24 is located along longitudinal axis 45 closer to impact tool attachment 30 at the opposite end from socket 18.

Figures 2, 3:
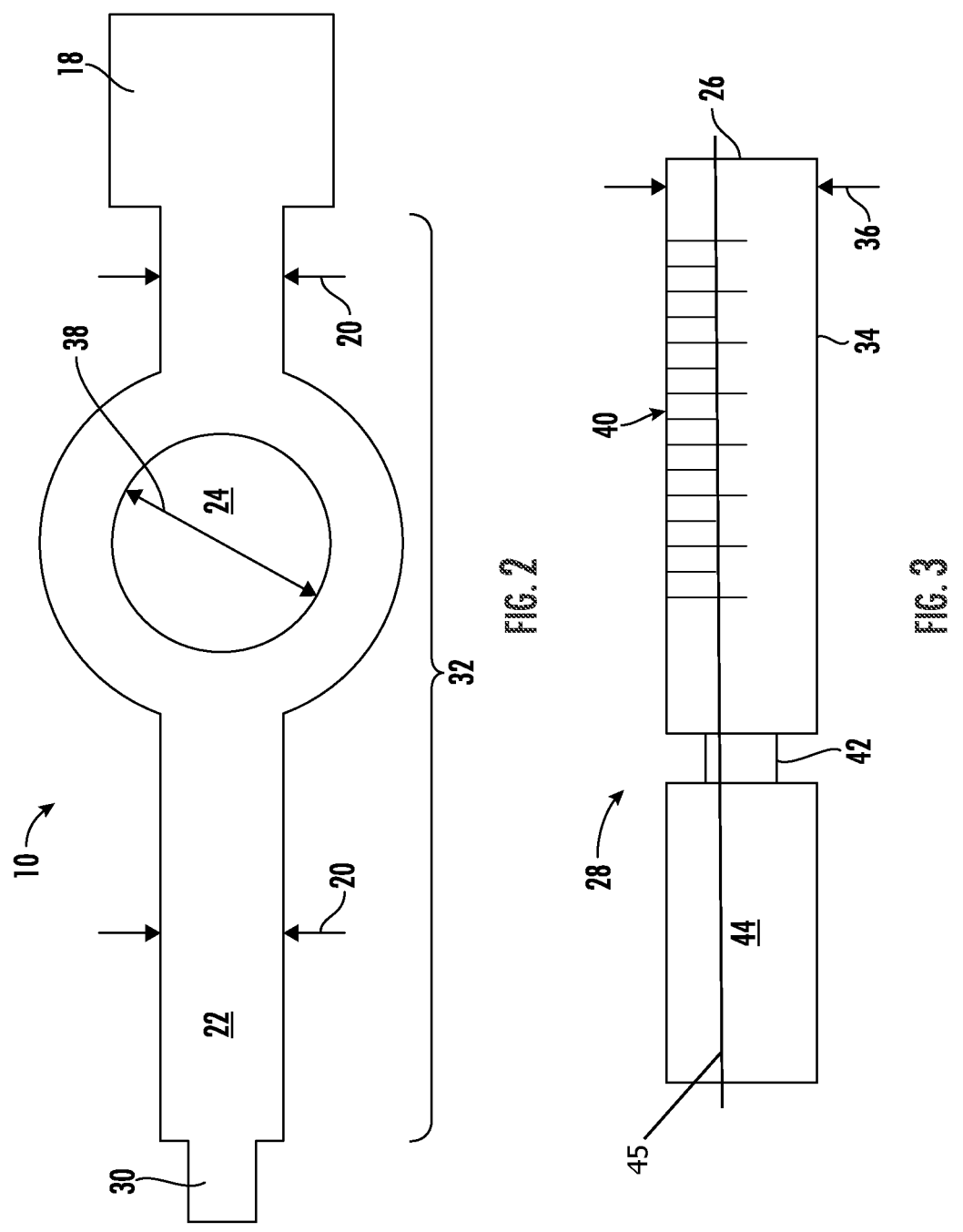
FIG. 2 is a torque stick, according to an exemplary embodiment.
FIG. 3 is a torque wrench configured to couple to an aperture of the torque stick shown in FIG. 2, according to an exemplary embodiment.

Referring to FIG. 2, a detailed view of torque stick 10 is shown. Torque stick 10 includes an elongated body 22 with a socket 18 on one end and an impact tool 12 attachment 30 on an opposite end. Specifically, socket 18 is located on the end of body 22 that couples to a rotary tool. Socket 18 couples torque stick 10 to an impact tool 12. Impact tool attachment 30 couples torque stick 10 to lug 14 to tighten a nut. Torque stick 10 includes a flex region 32 designed to flex or twist when the resistance on lug 14 exceeds a torque limit for joint 16. For example, as an impact/dynamic load is applied, torque stick 10 deflects in flex region 32 to limit the torque applied by impact tool 12. As shown in FIG. 2, a torque stick 10 includes a torque wrench aperture 24 configured to receive an attachment end 26 of torque wrench 28 (see FIG. 3).

FIG. 3 shows torque wrench 28 with a head or attachment end 26 on a wrench sleeve 34. An outer diameter 36 of torque wrench sleeve 34 is slightly less than inner diameter 38 of aperture 24. This configuration facilitates sliding sleeve 34 within aperture 24 to couple torque wrench 28 to torque stick 10 and apply a static torque load or rotational force on lug 14. In this arrangement, with torque wrench 28 coupled to torque stick 10, the torque applied to torque wrench 28 is transmitted to torque stick 10 via engagement between an outer surface of sleeve 34 and an inner surface of aperture 24, and this torque is then transmitted through torque stick 10 to lug 14.

Figure 4:
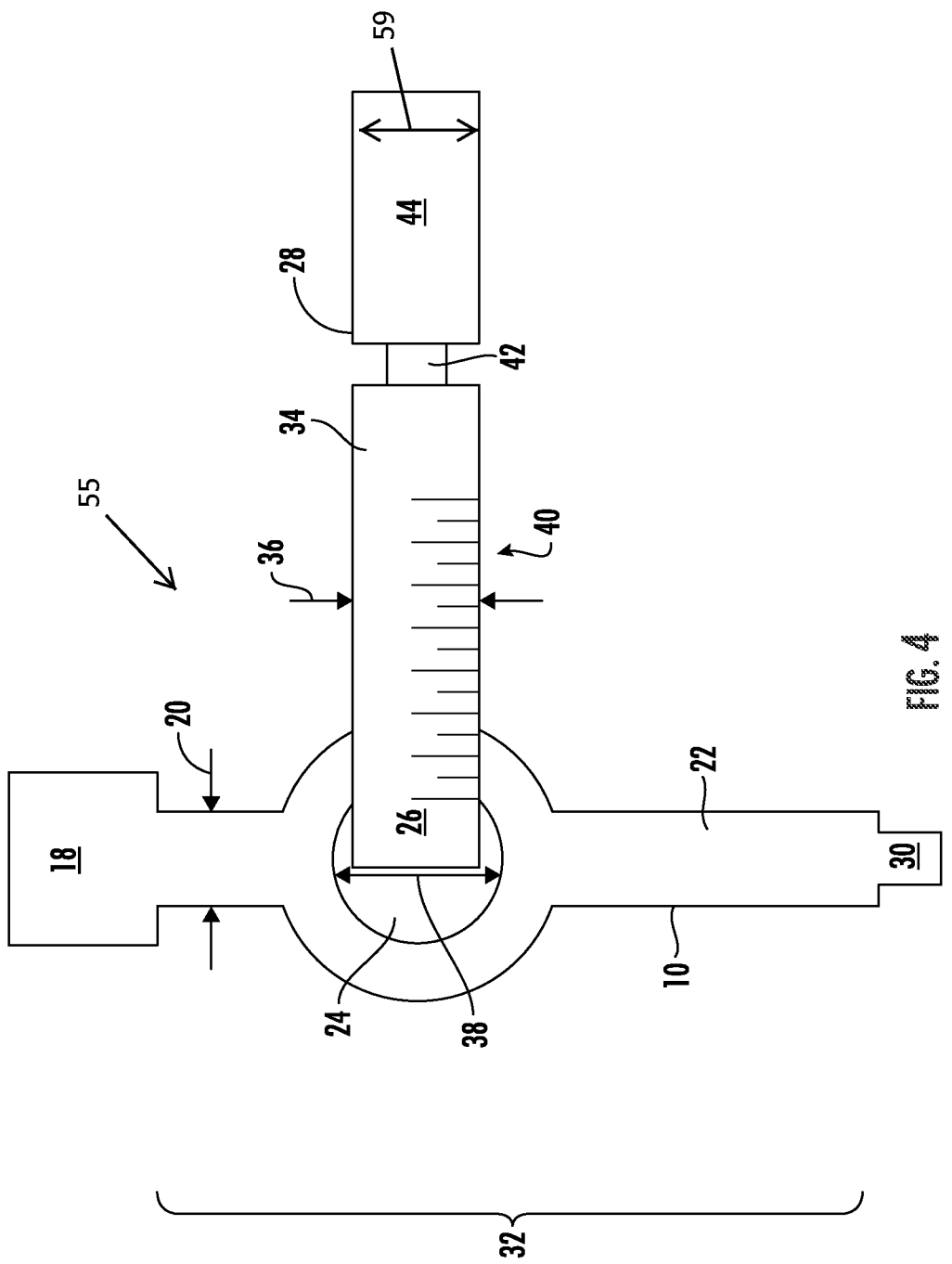
FIG. 4 is a torque stick with a torque wrench coupled to the aperture of the torque stick, according to an exemplary embodiment.

Sleeve 34 includes torque measurement indicia or a torque scale 40 that indicate the static torque load limit when aligned with torque wrench aperture 24 (FIG. 4). For example, the desired torque is applied by aligning torque scale 40 within aperture 24. In some embodiments, torque scale 40 is aligned on one side of aperture 24. When the desired torque scale 40 is aligned with an edge of aperture 24, torque wrench 28 is limited to the indicated torque specification. In some embodiments, torque wrench 28 includes a shaft 42 that interconnects and couples sleeve 34 to handle 44. Shaft 42 extends along longitudinal axis 45 and defines a length along longitudinal axis 45. The length of shaft 42 changes the effective continuous torque applied at the attachment end 26 of torque wrench 28. In other words, the location and placement of torque scale 40 on torque wrench 28 are dependent variables that depend on shaft 42 length.

In some embodiments, the torque specification is located on sleeve 34. For example, a dynamic/impact torque specification and/or a static/continuous torque specification for torque stick 10 is annotated or indicated on sleeve 34 and/or shaft 42. For example, a dynamic torque specification and/or static torque specification are indicated on shaft 42. The dynamic torque specification indicates the limit of an applied dynamic torque on shaft 42 under dynamic load. Similarly, the static torque specification indicates the limit of an applied static torque on shaft 42 under continuous static load (e.g., continuously/statically loaded). The thickness 20 and/or elastic modulus of shaft 42 determines the torque specification. For example, sleeve 42 includes torque scale 40 used to indicate the torque specification for shaft 42. The torque specification and/or torque scale show the applied torque limit under continuous and/or dynamic loads.

As used herein, the dynamic torque specification limits the applied dynamic/impact torque to define an applied dynamic torque limit. Similarly, the static torque specification limits the applied static/continuous to define an applied static torque limit. Unless the dynamic torque specification is specifically indicated, the torque specification generally refers to the static torque specification. The dynamic torque specification is less than the static torque specification so that the dynamic load does not exceed either the dynamic or the static torque specifications.

Sleeve 34 is coupled to elongated body 22 of torque stick 10. Sleeve 34 of torque wrench 28 is passed through aperture 24 of torque stick 10 until the desired torque limit is indicated by torque scale 40 near aperture 24. When the operator applies a continuous/static load, e.g., rotates torque wrench 28 within aperture 24, torque wrench 28 limits the applied static torque to the indicated torque specification.

In use, an operator connects impact tool 12 to torque stick 10 and dynamically rotates lug 14 (impact loading) until torque stick 10 flexes to indicate that the desired torque has been reached. The operator then inserts attachment end 26 within aperture 24 of torque stick 10 and aligns torque scale 40 on sleeve 34 with an edge of aperture 24. The operator then statically loads (e.g., using hand rotation) elongated body 22 coupled to lug 14 until torque wrench 28 tactually, visually, and/or audibly indicates the torque specification has been applied/reached. The operator then disassembles torque wrench 28 from torque stick 10 and lug 14. This enhances the speed and accuracy of reaching the torque specification on joint 16. Specifically, the combined use of torque stick 10 with torque wrench 28 eliminates the step of disconnecting torque stick 10 from lug 14 before coupling torque wrench 28 to lug 14.

FIG. 4 illustrates a torque limiting tool 55 that includes both a torque stick 10 and a torque wrench 28 to load torque stick 10 to the torque specification statically. Torque wrench 28 aligns with aperture 24 of torque stick 10 such that attachment end 26 of torque wrench 28 passes through aperture 24 of torque stick 10. In some embodiments, inner diameter 38 of aperture 24 and/or outer diameter of sleeve 34 is/are tapered to facilitate alignment of torque specification torque scale 40 on sleeve 34. Specifically, the outer surface of sleeve 34 has an external taper that slides within the internal tape created by inner diameter 38 of aperture 24. The external taper in sleeve 34 of torque wrench 28 cooperates/aligns with the internal taper formed by the tapered inner diameter 38 in torque aperture 24. When torque wrench 28 is inserted in internally tapered aperture 24 of torque stick 10, the external taper on torque wrench 28 is aligned with the internal taper. In this way, an edge of aperture 24 aligns with torque scale 40 on torque wrench 28 to indicate a torque specification. As shown in FIG. 4, attachment end 26 of torque wrench 28 is configured to fit and/or slide within aperture 24 to achieve the desired torque specification.

In some embodiments, handle 44 is cylindrical and/or too large (e.g., cylindrical handle 44 has an outer handle diameter or external diameter 59 that is greater than inner diameter 38 of aperture 24). Similarly, the maximum outer diameter 36 of sleeve 34 is located near handle 44 (e.g., nearest handle 44) and is greater than inner diameter 38 of aperture 24. In this way, handle 44 is prevented from sliding within or through torque stick 10. Torque wrench 28 is limited from extending all the way through torque stick 10. For example, torque scale 40 is located on sleeve 34 of torque wrench 28 to indicate to an operator the torque specification. The external diameter 59 of handle 44 is less than the maximum outer diameter 36 of the taper on sleeve 34 but greater than inner diameter 38 of aperture 38. In some embodiments, only one of external diameter 59 and/or maximum outer diameter 36 is greater than inner diameter 38. The external diameter 59 and/or outer diameter 36 limits torque wrench 28 from extending through aperture 24 and determines an effective length of torque wrench 28 in aperture 24.

The location of aperture 24 along elongated body 22 can change for different applications. In some embodiments, aperture 24 is located proximate to socket 18 and distally from impact tool attachment 30. In other embodiments, aperture 24 is located proximate to impact tool attachment 30 and distally from socket 18. In still other embodiments, aperture 24 is located in a generally central position axially along longitudinal axis 45 of elongated body 22. Changing the location of aperture 24 increases access for torque wrench 28 as needed in specific applications/uses and may utilize the torsional characteristics of torque stick 10 to ensure the applied torque at joint 16 is within the design torque specification. For example, in some applications, ease of use determines the location of aperture 24, whereas, in other applications, the accuracy of the applied torque for the torque specification determines aperture 24 location.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements. The position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

What is claimed is:

1. A torque stick, comprising:
an elongated shaft, the elongated shaft comprising a flex region and extending along a longitudinal axis from a first end to a second end opposite the first end;
a socket at the first end of the elongated shaft that is configured to couple to a rotary tool;
an impact tool attachment at the second end of the elongated shaft that couples to a fastener;
a torquing aperture along the elongated shaft between the first end and the second end, the torquing aperture configured to receive a wrench within the torquing aperture of the torque stick; and
a dynamic torque specification based on a thickness and an elastic modulus of the elongated shaft, wherein the dynamic torque specification indicates an applied dynamic torque limit under dynamic impact load;

wherein, when the torque stick is under a dynamic impact load from the rotary tool above the dynamic torque specification, the flex region of the elongated shaft deflects such that a portion of the dynamic impact load is absorbed by the torque stick and the torque applied by the impact tool attachment is less than or equal to the dynamic torque specification.

2. The torque stick of claim 1, further comprising a static torque specification for the torque stick based on the thickness and the elastic modulus of the elongated shaft, wherein the static torque specification is indicated on the elongated shaft near the torquing aperture, the static torque specification indicates an applied static torque limit under continuous load.

3. The torque stick of claim 1, wherein the elongated shaft has a thickness and elastic modulus that support a dynamic load of less than or equal to 100 ft-lb torque.

4. The torque stick of claim 1, wherein the aperture is centrally located between the socket at the first end and the impact tool attachment at the second end.

5. The torque stick of claim 1, wherein the aperture is located along the longitudinal axis closer to the socket at the first end than to the impact tool attachment at the second end.

6. The torque stick of claim 1, wherein the aperture is located along the longitudinal axis closer to the impact tool attachment at the second end than to the socket at the first end.

7. The torque stick of claim 1, further comprising an attachment end in the torquing aperture, wherein the attachment end couples to a torque wrench.

8. The torque stick of claim 7, wherein the torque wrench comprises a handle with an external diameter that is greater than an inner diameter of the aperture, such that the torque wrench is limited from extending through the aperture.

9. The torque stick of claim 7, further comprising a torque scale on the torque wrench, wherein the torque scale is aligned with an edge on the attachment end of the aperture, wherein when the torque scale is aligned with the edge of the aperture, the torque wrench is limited to a torque specification indicated on the torque scale.

10. The torque stick of claim 1, wherein the dynamic torque specification is indicated on the elongated shaft near the torquing aperture.

* * * * *